United States Patent
LaChance et al.

(10) Patent No.: US 7,055,918 B2
(45) Date of Patent: Jun. 6, 2006

(54) ATTACHMENT ELEMENT FOR JOINING A BACKPLASH TO A COUNTERTOP

(76) Inventors: James L. LaChance, 21701 Sherwood, Belleville, MI (US) 48111; Edward M. Collins, 10031 Mortenview, Taylor, MI (US) 48180

( * ) Notice: Subject to any disclaimer, the term of this patent is extended or adjusted under 35 U.S.C. 154(b) by 583 days.

(21) Appl. No.: 09/916,151

(22) Filed: Jul. 27, 2001

(65) Prior Publication Data

US 2003/0020378 A1 Jan. 30, 2003

(51) Int. Cl.
*A47B 96/18* (2006.01)

(52) U.S. Cl. .......................... 312/140.3; 52/463; 108/27
(58) Field of Classification Search ... 312/140.1–140.4; 52/34–35, 287.1, 288.1, 461, 463, 506.05; 403/231, 241; 4/631, 658; 108/27, 42, 48; 248/675, 188.1–188.2, 188.7–188.91, 448, 248/229.2, 228.5, 297.31, 500

See application file for complete search history.

(56) References Cited

U.S. PATENT DOCUMENTS

| | | | | | |
|---|---|---|---|---|---|
| 2,570,850 | A | * | 10/1951 | Pearson | 108/27 |
| 2,697,019 | A | * | 12/1954 | Stefan | 108/27 |
| 2,825,999 | A | * | 3/1958 | Dompieri | 108/27 |
| 2,981,580 | A | * | 4/1961 | Hansen | 108/27 |
| 3,007,213 | A | * | 11/1961 | Hobbs | 4/660 |
| 3,325,585 | A | * | 6/1967 | Brenneman | 174/48 |
| 3,951,371 | A | * | 4/1976 | Hoes | |
| 4,126,365 | A | * | 11/1978 | Bryant | 312/140.4 |
| 4,601,149 | A | * | 7/1986 | Dokan | 428/100 |
| 4,914,888 | A | * | 4/1990 | Hanson | 52/656.5 |
| 5,330,262 | A | * | 7/1994 | Peters | 108/27 |
| 5,419,264 | A | | 5/1995 | Davis | 108/27 |
| 5,452,666 | A | * | 9/1995 | Peters | 108/27 |
| 5,588,726 | A | * | 12/1996 | Lee | 312/263 |
| 5,688,569 | A | * | 11/1997 | Gilmore et al. | |
| 5,713,159 | A | * | 2/1998 | Schmidt | 52/204.53 |
| 5,715,643 | A | * | 2/1998 | Parkinson | 296/203.01 |
| 5,722,746 | A | * | 3/1998 | Hull et al. | 108/27 |
| 5,733,022 | A | | 3/1998 | Whetstone | 312/140.4 |
| 6,065,251 | A | * | 5/2000 | Kindrick | 108/157.13 |
| 6,115,982 | A | * | 9/2000 | Lindenberg | 52/272 |
| 6,131,521 | A | * | 10/2000 | Nelson et al. | 108/27 |
| 6,135,581 | A | * | 10/2000 | Kopp et al. | 108/27 |
| 6,186,605 | B1 | * | 2/2001 | Nelson | 312/140.4 |
| 6,257,151 | B1 | * | 7/2001 | Hale | 108/42 |
| 6,309,036 | B1 | * | 10/2001 | Ancel | 312/140.4 |
| 6,354,049 | B1 | * | 3/2002 | Bennett | 52/287.1 |

* cited by examiner

*Primary Examiner*—Daniel P. Stodola
*Assistant Examiner*—Jennifer E. Novosad
(74) *Attorney, Agent, or Firm*—Charles W. Chandler

(57) ABSTRACT

A pair of connector elements, one stapled, screwed or otherwise fastened to a countertop and the other stapled, screwed or otherwise fastened to the lower edge of a backsplash are snapped together to mount the backsplash in an upright position along the rear edge of the countertop.

8 Claims, 2 Drawing Sheets

ATTACHMENT ELEMENT FOR JOINING A BACKPLASH TO A COUNTERTOP

BACKGROUND AND SUMMARY OF THE INVENTION

This invention relates to a connector means for attaching a backsplash along the rear edge of a countertop. Countertops are installed in kitchens and have an elongated rear edge positioned adjacent a wall. A backsplash is installed along the rear edge of the countertop to prevent water or other substances from passing down between the rear edge of the countertop and the wall.

Such means for attaching the backsplash to the countertop may be found in the prior art, including for example, U.S. Pat. Nos. 4,126,365 issued Nov. 21, 1978 to Eugene E. Bryant for "Counter Top to Back-Splash Element Attachment"; U.S. Pat. Nos. 5,419,264 issued May 30, 1995 to Stanley A. Davis for "Backsplash Molding and Method of Manufacturing the Same"; and U.S. Pat. Nos. 5,733,022 issued Mar. 31, 1998 to William F. Whetstone for "Backsplash and Countertop Assembly".

The present invention provides a novel means for quickly and inexpensively mounting a backsplash on a countertop using an inverted L-shaped connector having a rear wall that is stapled, screwed or otherwise fastened to the rear edge of the countertop, and a flange that is disposed parallel to and a short distance above the countertop. The flange has a series of parallel locking ridges.

The backsplash has a groove along its lower rear edge. A series of short plastic connectors are stapled, screwed or otherwise fastened in the groove. The short connectors have a series of parallel locking ridges that mate with the ridges on the flange of the L-shaped connector in such a manner that the backsplash is supported in an upright position on the countertop.

Still further objects and advantages of the invention will become readily apparent to those skilled in the art to which the invention pertains upon reference to the following detailed description

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
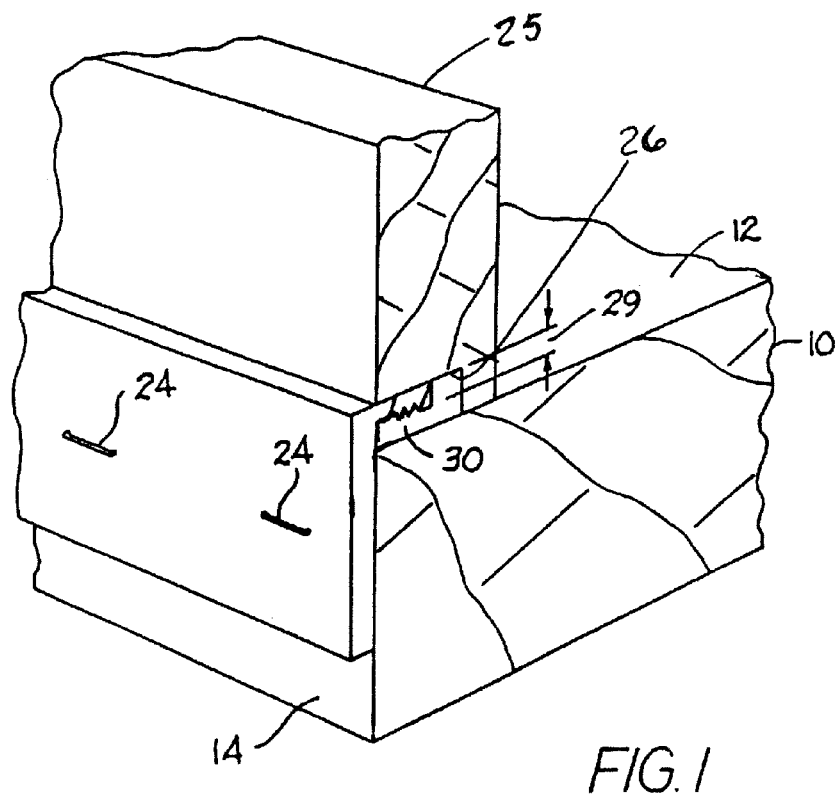
FIG. 1 is a sectional fragmentary perspective view of a countertop rear edge and a pair of preferred connector elements joining the backsplash to the countertop.

Referring to the drawings, FIG. 1 illustrates a countertop 10 that may be made of plywood or other suitable materials. A relatively thin sheet 12 of a water-impervious material is fastened to the top surface of the countertop. The countertop has a rear edge 14, which is to be mounted adjacent the wall of a kitchen or the like.

Figure 2:
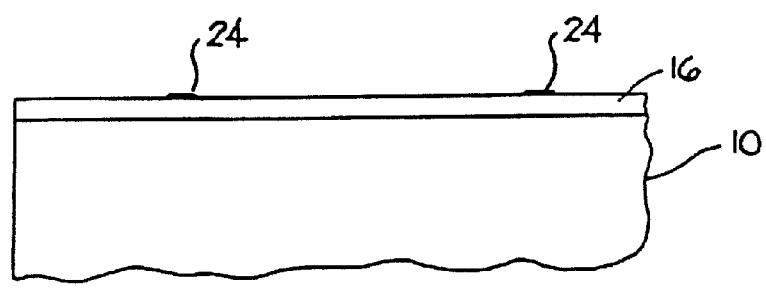
FIG. 2 is plan view of the rear edge of the countertop showing the L-shaped element stapled, screwed or otherwise fastened in position.
Figure 3:
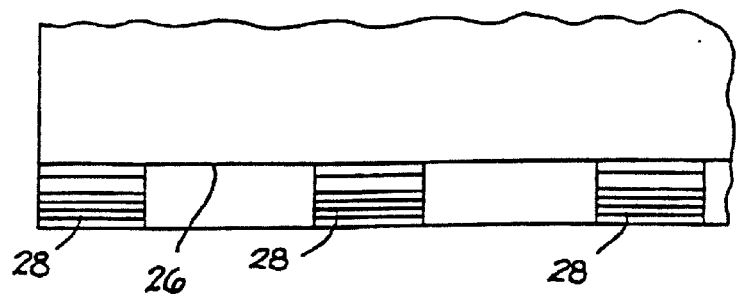
FIG. 3 is a rear view of the backsplash separated from the countertop to show the location of the connector elements.
Figure 5:
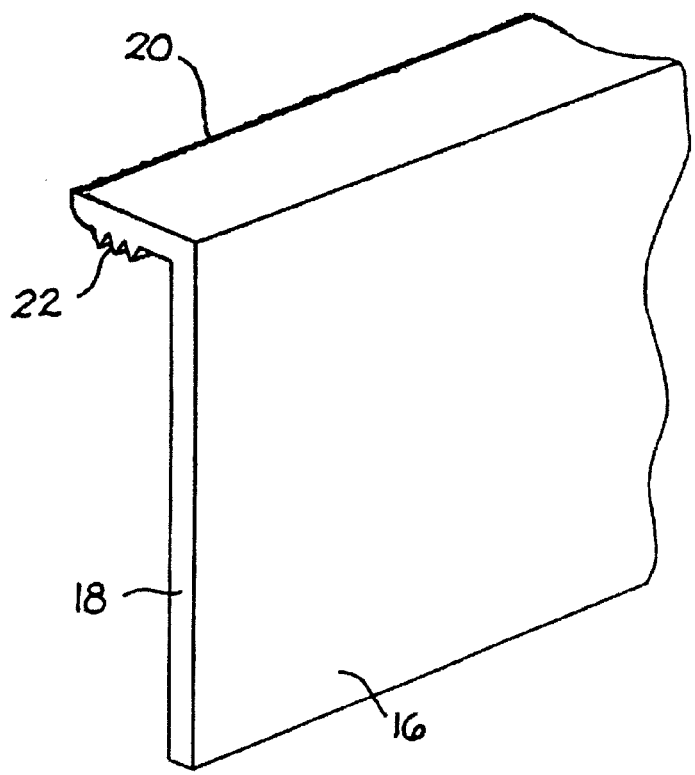
FIG. 5 is a fragmentary perspective view of the L-shaped connector element.

Referring to FIGS. 2 and 5, an elongated extruded vinyl, inverted L-shaped connector 16 (gripper) includes an elongated rear wall 18 and a flange 20 mounted at right angles to wall 18. The inner surface of flange 20 has a series of resilient, parallel, locking, ridges 22, which are parallel to the length of the connector. For illustrative purposes, wall 18 may have a height of about 1.375" and the flange may have a width of about 0.4375", with four ridges. The connector may have any suitable length and is attached by staple fasteners 24 to the rear edge of the countertop such that flange 20 is spaced a short distance above the countertop.

Wall 18 has a thickness of about 0.0625" while the flange has a thickness of about 0.125".

The lower edge of a backsplash 25 has a rear groove 26 that extends along the length of the backsplash, and from the rear surface, partially through the thickness of the backsplash.

Figure 4:
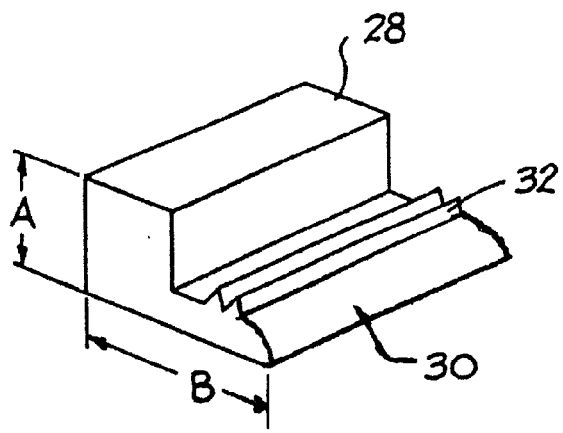
FIG. 4 is a perspective view of a typical backsplash connector element.

A plurality of short extruded vinyl connectors 28 (grippers) are stapled, screwed or otherwise fastened in groove 26. Referring to FIG. 4, a typical connector 28 has a thickness "A" of about 0.25" and a width "B" of about 0.625". Each connector has a flange 30 with four pointed, resilient parallel ridges 32. Connectors 28 are fastened, such as by staples, in groove 26 about 12" apart. Each connector 28 is about 0.375" long. Groove 26 has a height accommodating thickness "A" of the connector, forming an opening 29 (FIG. 1) between flange 30 and the top surface of the groove in such a manner that flange 30 on the L-shape can be snapped into the opening. The ridges of the two flanges are sufficiently resilient to permit the ridges on the backsplash to be pushed against flange 20 so that the opposing ridges mate together to support the backsplash in an upright position.

Preferably the combined width "B" of the backsplash connector plus the thickness of rear wall 18 of the countertop connector is slightly greater than the depth of groove 26 so that the top of the backsplash is inclined toward the wall, providing about a 0.125" clearance between the bottom edge of the backsplash and the wall.

Having described our invention, we claim:

1. In combination with a countertop having an elongated rear edge and a top surface, and a backsplash having a lower edge and a rear wall, a connector assembly comprising:

a first connector comprising an L-shaped element having a wall integrally connected at a right angle to a first flange;

fastener means for attaching the wall of the first connector to the rear edge of the countertop such that the first flange overlays the top surface of the countertop, in a position spaced above the countertop, the first flange having a gripper surface facing the top surface of the countertop;

a second connector element comprising a body adapted to be attached to the lower edge of the backsplash and an integral second flange disposed in a spaced relationship to the backsplash to form an opening, the second flange having a gripper surface facing the lower edge of the backsplash, and spaced from the backsplash a distance accommodating a thickness of the first flange;

whereby the rear wall of the backsplash is disposed in a generally coplanar relationship with the rear edge of the countertop by inserting the first flange in said opening to mate the gripper surface of the first flange with the gripper surface of the second flange.

2. A combination as defined in claim 1, in which the attaching means comprises a staple fastener.

3. A combination as defined in claim 1, in which the gripper surface on the first flange comprises a series of parallel ridges, and the gripper surface on the second flange comprises a complementary series of parallel ridges that mate with the ridges in the first flange.

4. A combination as defined in claim 1, in which the lower edge of the backsplash has a groove for receiving the flanges of the first and second connectors, the groove extending partially from the rear wall of the backsplash toward a front surface thereof.

5. A combination as defined in claim 1, in which the first and second connectors are each formed of an extruded vinyl.

6. A method for mounting a backsplash having a lower edge and a rear wall on a countertop having an elongated rear edge and a top surface, said method comprising the steps of:

attaching a first connector comprising an L-shaped element having a wall integrally connected at a right angle to a first flange, to the rear edge of the countertop such that the first flange overlays the top surface of the countertop, in a position spaced above the countertop, the first flange having a gripper edge facing the top surface of the countertop;

attaching a second connector element to the lower edge of the backsplash to support an integral second flange in a spaced relationship to the backsplash to form an opening, the second flange having a gripper surface facing the lower edge of the backsplash, and accommodating the thickness of the first flange; and inserting the first flange in said opening to mate the gripper edge of the first flange with the gripper surface of the second flange, whereby the rear wall of the backsplash is disposed in a generally coplanar relationship with the rear edge of the countertop.

7. A connector assembly for mounting a backsplash having a lower edge and a rear wall to a countertop having an elongated rear edge and a top surface, the assembly comprising:

a first connector (16) comprising an L-shaped element having a single flange (20), and a wall (18) integrally connected at a right angle to said single flange; said single flange having a gripper surface (22) and a smooth flat surface on the opposite side thereof;

at least one fastener member (24) for attaching the first connector to the rear edge of a countertop such that the single flange of the first connector forms a forward facing opening defined by said single flange and said countertop;

a second connector (28) comprising a body adapted to be attached to the lower edge of a backsplash and having an integral single flange (30) having a first side with a gripper surface (32) adapted to mate with the gripper surface of the first connector when the flange of the second connector is inserted into said forward facing opening, the single flange of the second connector having a flat surface on the opposite side thereof;

whereby the rear wall of the backsplash is adapted to be disposed in a generally coplanar relationship with the rear edge of the countertop by inserting the flange of the second connector in said forward facing opening to mate the gripper surface of the first connector with the gripper surface of the second connector Such that the flat surface of the second connector is adapted to rest against the top surface of the countertop in a supporting manner.

8. A connector assembly as defined in claim 7, in which the second connector has a planar surface and a thickness such that when seated in a notch in the lower edge of the backsplash, said planar surface is co-planar with an un-notched portion of the lower edge of the backsplash.

* * * * *